US009453441B2

(12) United States Patent
Kontani et al.

(10) Patent No.: US 9,453,441 B2
(45) Date of Patent: Sep. 27, 2016

(54) BREATHER APPARATUS FOR INTERNAL COMBUSTION ENGINE FOR VEHICLE

(71) Applicant: HONDA MOTOR CO., LTD., Tokyo (JP)

(72) Inventors: Masahiro Kontani, Wako (JP); Hiroshi Mahira, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 3 days.

(21) Appl. No.: 14/665,027

(22) Filed: Mar. 23, 2015

(65) Prior Publication Data

US 2015/0275717 A1    Oct. 1, 2015

(30) Foreign Application Priority Data

Mar. 26, 2014  (JP) .................................. 2014-064782

(51) Int. Cl.
| | |
|---|---|
| *F02B 25/06* | (2006.01) |
| *F01M 13/00* | (2006.01) |
| *F02M 35/04* | (2006.01) |
| *F02M 35/10* | (2006.01) |
| *F02M 35/16* | (2006.01) |
| *F02M 25/06* | (2016.01) |
| *F01M 13/04* | (2006.01) |

(52) U.S. Cl.
CPC ............. *F01M 13/00* (2013.01); *F01M 13/04* (2013.01); *F01M 13/0405* (2013.01); *F02M 25/06* (2013.01); *F02M 35/048* (2013.01); *F02M 35/10222* (2013.01); *F02M 35/162* (2013.01); *F01M 2013/005* (2013.01); *F01M 2013/0461* (2013.01); *Y02T 10/121* (2013.01)

(58) Field of Classification Search
CPC ........... F02M 13/00; F02M 35/10222; F02M 35/162; F02M 35/048; F02M 13/0405; F02M 13/04; F02M 2013/0461; F02M 2013/005; Y02T 10/121
USPC ................................................... 123/572–574
See application file for complete search history.

(56) References Cited

U.S. PATENT DOCUMENTS

| 4,856,486 A | * | 8/1989 | Mori | ..................... | F01M 13/025 |
| | | | | | 123/192.2 |
| 4,993,375 A | * | 2/1991 | Akihiko | ............. | F01M 13/0416 |
| | | | | | 123/195 C |
| 7,475,681 B2 | * | 1/2009 | Kuji | ....................... | F01M 13/04 |
| | | | | | 123/41.86 |
| 2006/0254566 A1 | * | 11/2006 | Yasuhara | ............. | F01M 13/022 |
| | | | | | 123/572 |

FOREIGN PATENT DOCUMENTS

JP          4732325 B2      7/2011

* cited by examiner

*Primary Examiner* — Marguerite McMahon
(74) *Attorney, Agent, or Firm* — Birch, Stewart, Kolasch & Birch, LLP

(57) ABSTRACT

A breather apparatus for an internal combustion engine for a vehicle in which an air cleaner is disposed above a crankcase. A breather tube is provided for guiding blow-by gas exhausted from the crankcase. The breather tube is coupled with a breather chamber formed in the air cleaner to separate gas and liquid in the breather chamber in the air cleaner. An upstream side flow path, coupled to the breather tube, and a downstream side flow path, continuously extending in a substantially U-shape to the upstream side flow path, are formed in the breather chamber.

20 Claims, 4 Drawing Sheets

BREATHER APPARATUS FOR INTERNAL COMBUSTION ENGINE FOR VEHICLE

CROSS-REFERENCE TO RELATED APPLICATIONS

The present application claims priority under 35 USC 119 to Japanese Patent Application No. 2014-064782 filed Mar. 26, 2014 the entire contents of which are hereby incorporated by reference.

BACKGROUND OF THE INVENTION

1. Field of the Invention

The present invention relates to a breather apparatus for an internal combustion engine in which an air cleaner is disposed above a crankcase which configures part of an engine main body incorporated in a vehicle body frame and supports a crankshaft for rotation, and a breather tube for guiding blow-by gas exhausted from the crankcase is coupled with a breather chamber formed in the air cleaner.

2. Description of Background Art

A breather apparatus is described in Japanese Patent No. 4732325.

However, in the breather apparatus disclosed in Japanese Patent No. 4732325, the breather chamber in the air cleaner is formed as a single chamber. The separation of gas and liquid for separating liquid components from the blow-by gas may not be performed sufficiently in the breather chamber. Therefore, in order to accelerate separation of gas and liquid, it is desired to provide a length of a flow path for the blow-by gas in the breather chamber to be as great as possible.

SUMMARY AND OBJECTS OF THE INVENTION

An embodiment of the present invention has been made in view of such a situation as described above. It is an object of an embodiment of the present invention to provide a breather apparatus for an internal combustion engine for a vehicle which can accelerate separation of gas and liquid in a breather chamber formed in an air cleaner.

In order to attain the object described above, according to an embodiment of the present invention, a breather apparatus for an internal combustion engine for a vehicle, includes an air cleaner disposed above a crankcase which configures part of an engine main body incorporated in a vehicle body frame and supports a crankshaft for rotation. A breather tube is coupled with a breather chamber formed in the air cleaner and is configured to guide blow-by gas exhausted from the crankcase. An upstream side flow path is provided wherein the breather tube is coupled thereto. A downstream side flow path is provided that continuously extends in a substantially U-shape to the upstream side flow path in the breather chamber.

According to an embodiment of the present invention, the air cleaner is disposed above the crankcase such that a bottom portion thereof is inclined with respect to a horizontal plane. The upstream side flow path in the breather chamber is disposed at a position lower than that of the downstream side flow path.

According to an embodiment of the present invention, the breather chamber is formed from a bottom plate which configures the bottom portion of the air cleaner, a wall portion provided in a projecting manner from the bottom plate so as to continuously extend in an endless form so as to configure an outer hull of the breather chamber, and a lid member fixed to a projecting end of the wall portion. A cutout communicating with a purification chamber in the air cleaner is provided on at least one of a portion of the wall portion near to the lid member and the lid member.

According to an embodiment of the present invention, a passage member for guiding air to the engine main body side is disposed so as to extend through the bottom plate such that an upstream end portion of the passage member is in communication with the purification chamber. A slit communicating with a lower portion in the air cleaner is formed on a side wall of the passage member.

According to an embodiment of the present invention, a guide projection which surrounds part of at least one of a plurality of passage members is provided in a projecting manner on the bottom plate such that liquid components moving along an upper face of the bottom plate are guided to at least one of a plurality of slits provided on the one passage member.

According to an embodiment of the present invention, the engine main body is configured in a V-shape by having a pair of banks which form a valley therebetween. The breather chamber is disposed in the valley so as to face the valley from above and is formed in a rectangular shape having a longitudinal direction coincident with the direction of an axial line of the crankshaft.

According to an embodiment of the present invention, the lid member and the bottom plate are each configured from a resin material. The lid member is fixed to the wall portion by a fixing member formed as a separated member from the lid member and the bottom plate.

According to an embodiment of the present invention, part of the vehicle body frame is configured from a head pipe at a front end of the vehicle body frame. A main frame extends rearwardly from the head pipe and includes a hollow monocoque structure. At least part of a cleaner case of the air cleaner is configured from the main frame and the bottom plate configured to close up an opening provided at a lower portion of the main frame.

According to an embodiment of the present invention, the upstream side flow path and the downstream side flow path continuously extending in a substantially U-shape to the upstream side flow path are formed in the breather chamber. Therefore, the length of the flow path for the blow-by gas in the breather chamber can be secured as long as possible. Thus, separation of gas and liquid in the breather chamber can be accelerated.

According to an embodiment of the present invention, the upstream side flow path in the breather chamber is placed at the position lower than that of the downstream side flow path. Therefore, liquid components separated from the blow-by gas in the breather chamber can be returned to the breather tube side by gravity.

According to an embodiment of the present invention, the breather chamber is configured from the bottom plate, wall portion continuously extending in an endless form and projected from the bottom plate, and the lid member fixed to the projecting end of the wall portion. Further, the cutout is provided on at least one of the portion of the wall portion near to the lid member. Therefore, the blow-by gas can be guided into the air cleaner, and the liquid component collected in the breather chamber can be allowed to leak from the cutout into the air cleaner.

According to an embodiment of the present invention, the passage member extends through the bottom plate and the slit communicating with the lower portion in the air cleaner is formed on the side wall of the passage member. Therefore, the liquid components leaking from the breather chamber into the air cleaner can be guided from the slit into the passage member and then can be returned to the engine main body side.

According to an embodiment of the present invention, the guide projection provided on the bottom plate surrounds part of the passage member such that the liquid components are guided to at least one of the plurality of slits provided on the passage member. Therefore, the liquid components leaking from the breather chamber into the air cleaner can be moved along the guide projection so as to be guided to the slit side, and the liquid components can be effectively guided from the air cleaner into the passage member.

According to an embodiment of the present invention, since the breather chamber is disposed in the valley between the banks of the engine main body configured in the V-form so as to face the valley from above, the breather chamber can be disposed compactly. Further, the breather chamber is formed in a rectangular shape having a longitudinal direction coincident with the direction of the axial line of the crankshaft. Therefore, the breather chamber can be formed greater utilizing the space of the valley between the banks.

According to an embodiment of the present invention, since the lid member configured from a resin material is fixed to the wall portion of the bottom plate configured from a resin material by a fixing member formed as a separated member from the lid member and the bottom plate, the breather chamber can be formed at a low cost.

According to an embodiment of the present invention, the air cleaner can be configured compactly by configuring the main frame having a hollow monocoque structure as part of the cleaner case. The breather chamber can be formed easily in the air cleaner by forming the breather chamber on the bottom plate which closes up the opening provided at a lower portion of the main frame. Therefore, the entire breather apparatus can be configured compactly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention is described with reference to the drawings. It is to be noted that, in the following description, forward and rearward, upward and downward, and leftward and rightward directions coincide with directions as viewed from a rider who rides on a motorcycle.

Figure 1:
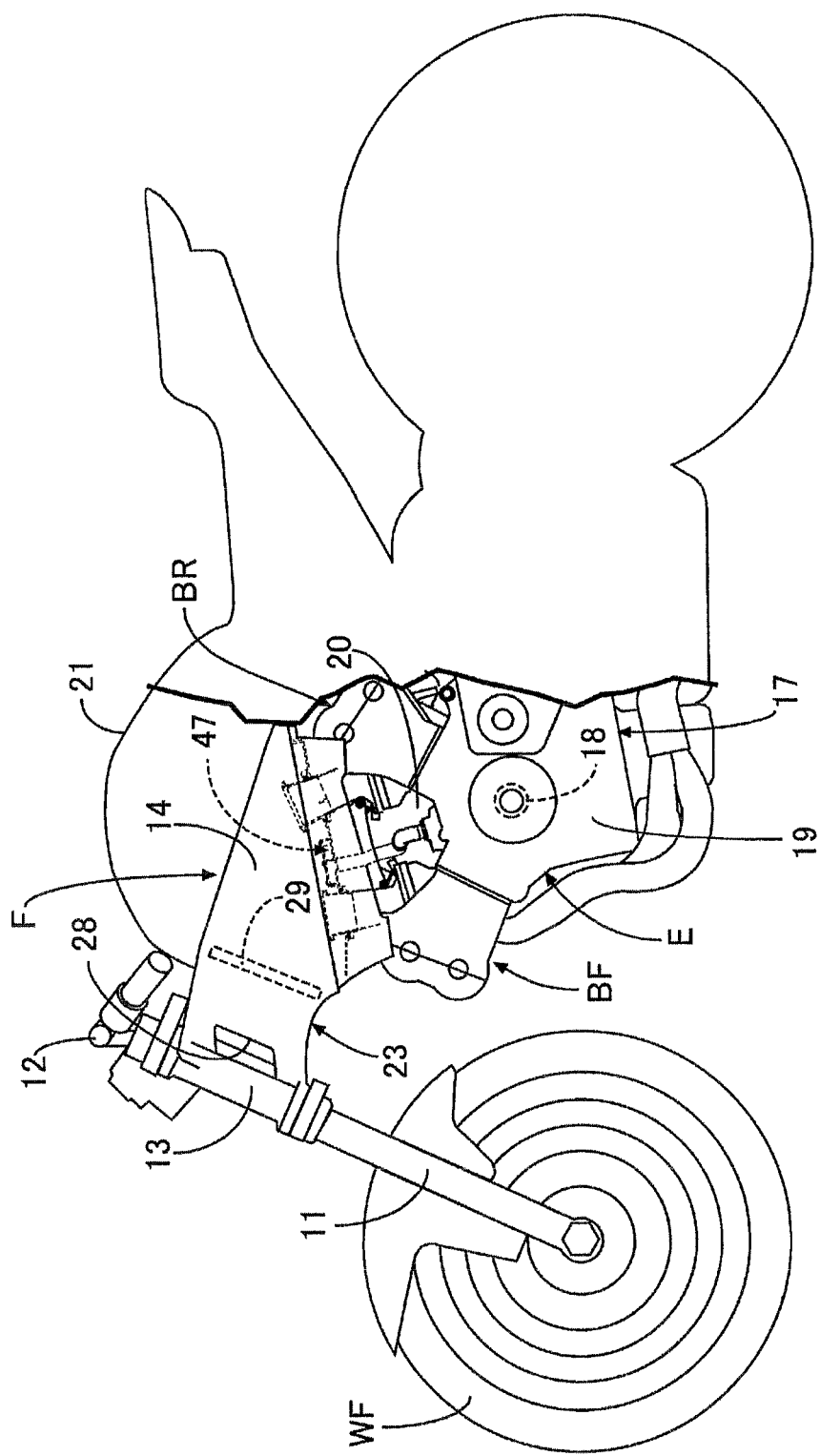
FIG. 1 is a left side elevational view of part of a motorcycle.

Referring to FIG. 1, part of a vehicle body frame F of a motorcycle which is a vehicle includes a head pipe 13 which supports a front fork 11 supporting a front wheel WF for rotation, and a steering handlebar 12 for steering operation, and a main frame 14 extending rearwardly downwardly from the head pipe 13. An engine main body 17 of a V-type internal combustion engine E configured, for example, with four cylinders is incorporated in the main frame 14.

Figure 2:
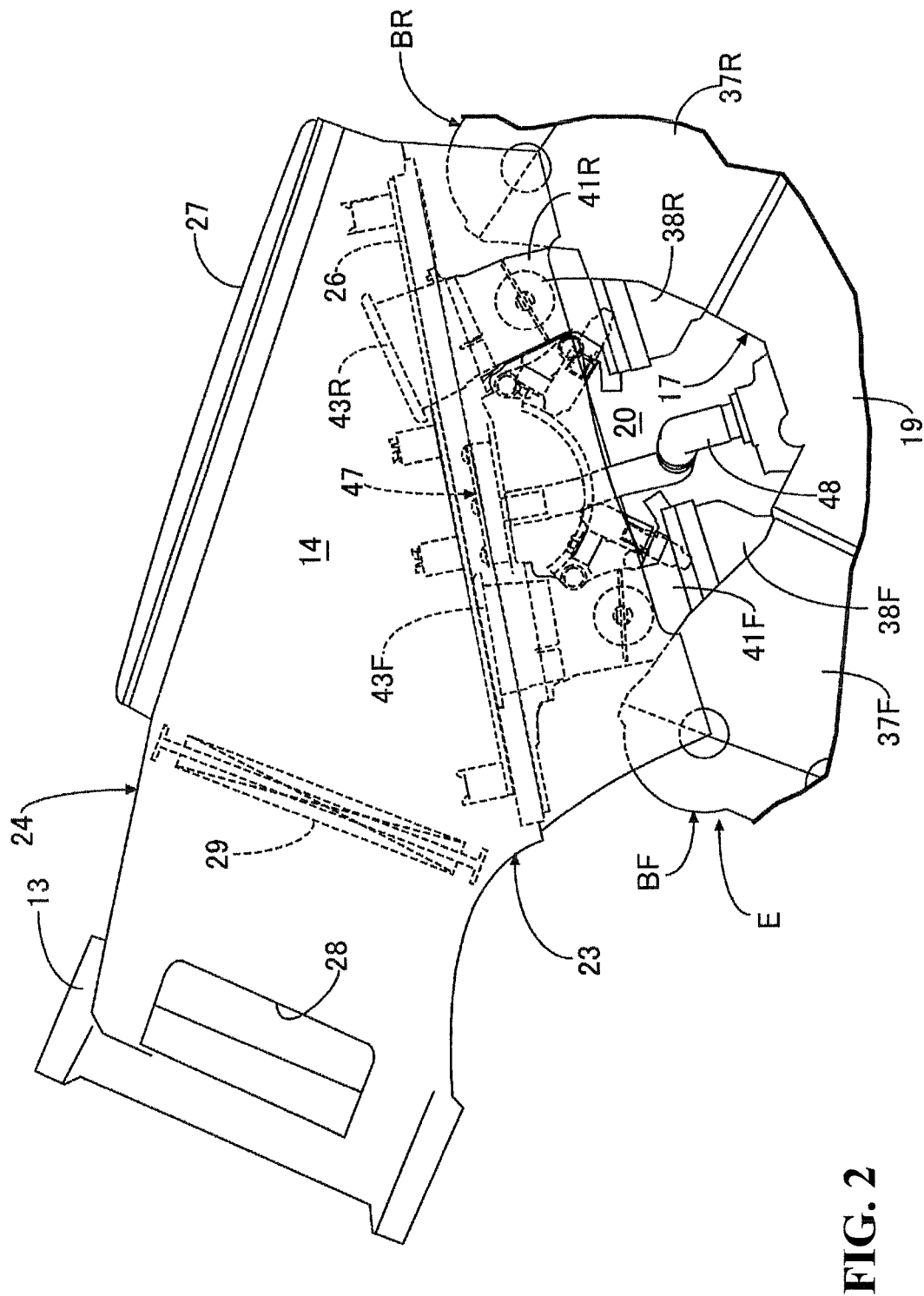
FIG. 2 is a left side elevational view of part of a main frame and an engine.

Referring also to FIG. 2, the engine main body 17 has a crankcase 19 which supports a crankshaft 18, which extends in a vehicle widthwise direction, for rotation thereon, and a pair of banks, namely, a front bank BF and a rear bank BR, extending upwardly from the crankcase 19 so as to form a valley 20 therebetween. The front and rear banks BF and BR are disposed in a separated relationship from each other in a forward and rearward direction so as to form a V-shape, and two cylinders juxtaposed in an axial line direction of the crankshaft 18 are disposed in each of the front and rear banks BF and BR. Further, a fuel tank 21 is supported on the main frame 14 above the engine main body 17.

Figure 3:
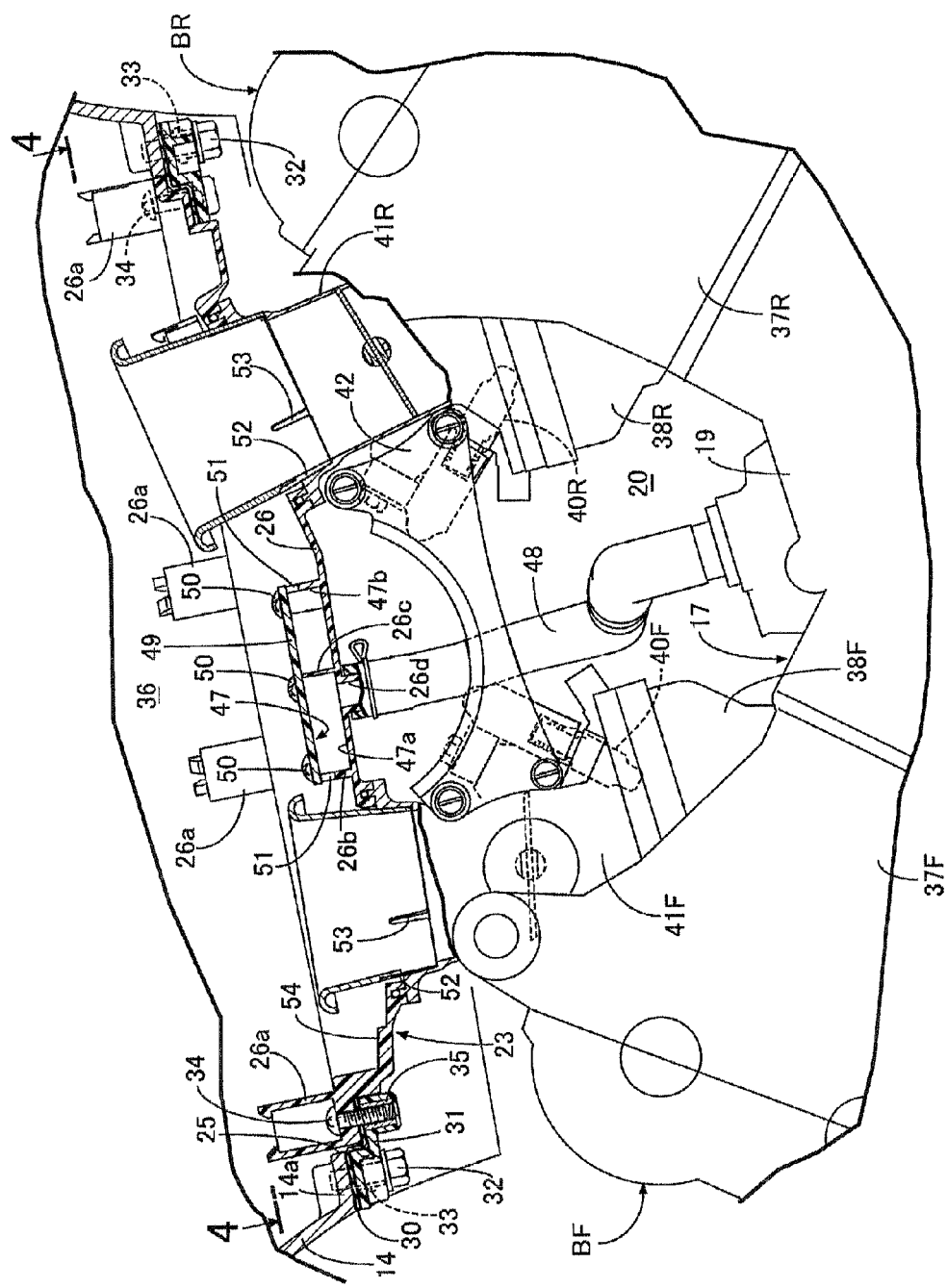
FIG. 3 is a vertical sectional side elevational view of part of the engine in a state in which a lower portion of an air cleaner is cut out.
Figure 4:
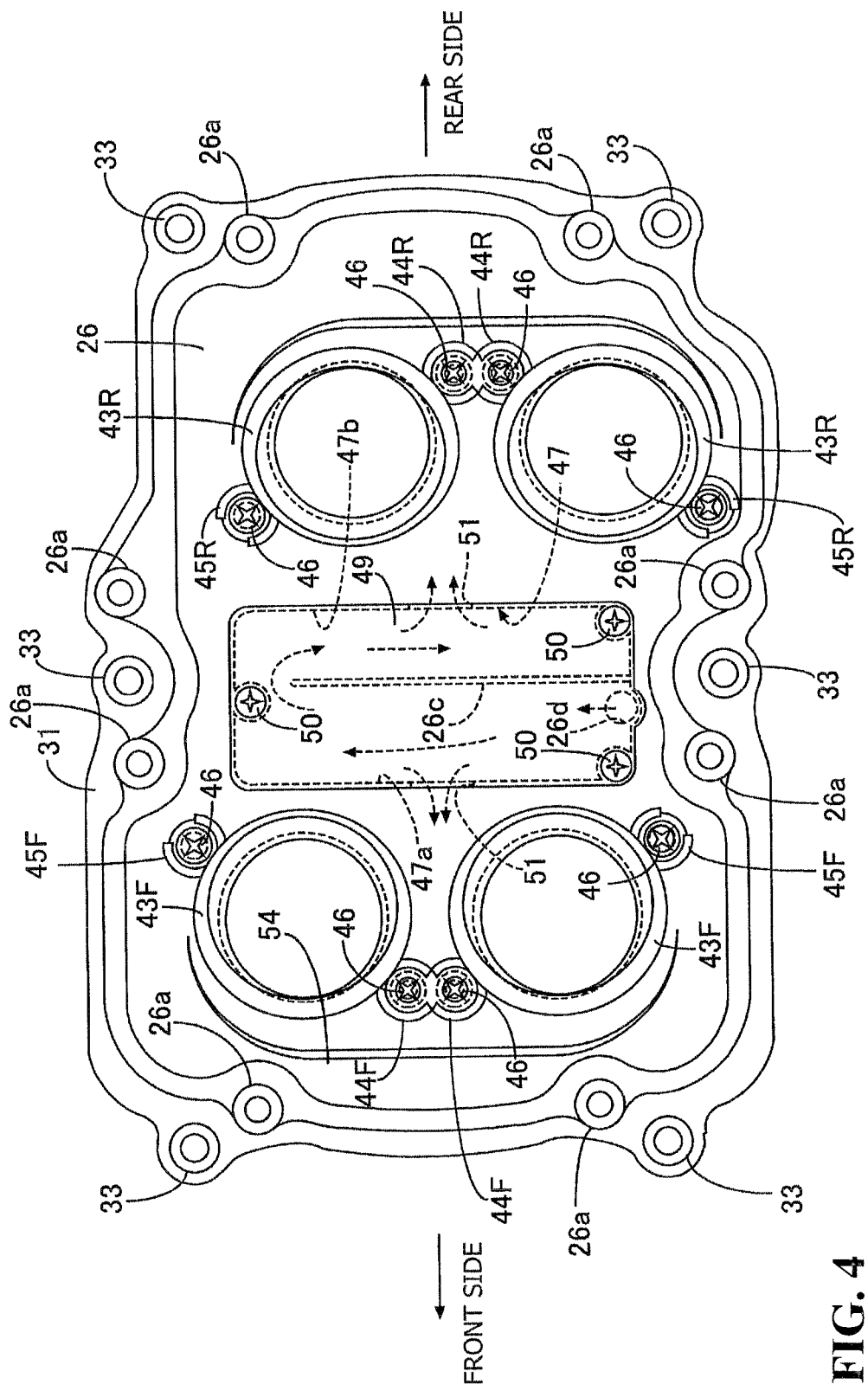
FIG. 4 is a view of a bottom plate and a supporting frame as viewed in the direction indicated by an arrow mark of a line 4-4 of FIG. 3.

Referring also to FIG. 3, a single air cleaner 23 common to the front bank BF and the rear bank BR is disposed above the engine main body 17. At least part of a cleaner case 24 of the air cleaner 23 is configured from the main frame 14 having a hollow monocoque structure and a bottom plate 26 which closes up an opening 25 provided at a lower portion of the main frame 14. In the present embodiment, the cleaner case 24 is configured from the main frame 14 and the bottom plate 26 as well as a cap 27 fastened to an upper portion of the main frame 14 so as to close up an opening (not depicted) provided at an upper portion of the main frame 14. A pair of left and right suction ports 28 for introducing air from the outside into the cleaner case 24 are provided at a front portion of the main frame 14 so as to be disposed at both sides of the head pipe 13.

A cleaner element 29 is attached to an intermediate portion in the forward and rearward direction of the main frame 14 such that a space between the cleaner element 29 and the suction ports 28 in the main frame 14 is used as a non-purification chamber.

A flange portion 14a swollen in an inner side direction so as to form the opening 25 is integrally provided on an inner face of a lower portion of the main frame 14. A supporting frame 31, cooperating with a lower face of the flange portion 14a to sandwich therebetween a seal member 30 extending in an endless form, is fastened to the flange portion 14a by a plurality of bolts 32.

The supporting frame 31 is formed from a resin material, and a cylindrical collar 33 made of metal is coupled by molding with each of a plurality of locations, for example, with six locations, of the supporting frame 31 spaced in a circumferential direction from each other. The bolts 32 inserted in the collars 33 are screwed in the flange portion 14a.

The bottom plate 26 is configured from a resin material, and a cylindrical portion 26a to be inserted into the cleaner case 24 is provided integrally in a projecting manner at a plurality of locations, for example, at six locations, spaced from each other in a circumferential direction of the bottom plate 26. A screw member 34 to be inserted from the cylindrical portion 26a into the bottom plate 26 is screwed into a nut 35 coupled by molding with the supporting frame 31 such that the bottom plate 26 is fixed to the main frame 14 through the supporting frame 31. A purification chamber 36 disposed at a location rearwardly of the cleaner element 29 is formed from the cleaner element 29, cap 27, bottom plate 26 and main frame 14.

In addition, the bottom plate 26 is disposed in an inclined relationship with respect to a horizontal plane, and, in the present embodiment, the bottom plate 26 is disposed so as to be inclined forwardly and downwardly.

Intake side coupling cylinder portions 38F and 38R individually corresponding to a pair of cylinders are provided so as to extend in an upward and downward direction on side walls of cylinder heads 37F and 37R in the front and rear banks BF and BR of the engine main body 17, the side walls facing the valley 20.

Throttle bodies 41F at the front bank BF side at which a fuel injection valve 40F is provided are coupled individually with the intake side coupling cylinder portion 38F of each cylinder in the cylinder head 37F of the front bank BF. In addition, throttle bodies 41R at the rear bank BR side at which a fuel injection valve 40R is provided are coupled individually with the intake side coupling cylinder portion 38R of each cylinder in the cylinder head 37R of the rear bank BR. The throttle bodies 41F and 41R are coupled with each other through a coupling plate 42.

Air funnels 43F and 43R which are passage members for guiding air to the cylinder heads 37F and 37R of the front bank BF and the rear bank BR in the engine main body 17 are disposed so as to extend through the bottom plate 26 such that upstream end portions of the air funnels 43F and 43R are in communication with the purification chamber 36. A downstream end portion of each air funnel 43F at the front bank BF side is fitted with the upstream end portion of the throttle body 41F at the front bank BF side, and a downstream end portion of each air funnel 43R at the rear bank BR side is fitted with the upstream end portion of the throttle body 41R at the rear bank BR side.

Attachment arm portions 44F coupled integrally with each other and attachment arm portions 45F disposed at the opposite side to the attachment arm portions 44F with respect to a center axial line of the air funnels 43F are integrally provided on the paired air funnels 43F corresponding individually to the pair of cylinders at the front bank BF side. Further, attachment arm portions 44R coupled integrally with each other and attachment arm portions 45R disposed at the opposite side to the attachment arm portions 44R with respect to a center axial line of the air funnels 43R are integrally provided on the paired air funnels 43R corresponding individually to the pair of cylinders at the rear bank BR side. The attachment arm portions 44F, 45F, 44R, and 45R are fastened to an upper face of the bottom plate 26 individually by screw members 46.

In addition, a breather chamber 47 is formed in the air cleaner 23 so as to be disposed between the air funnels 43F at the front bank BF side and the air funnels 43R at the rear bank BR side. A breather hose 48 which is a breather tube for guiding blow-by gas exhausted from the crankcase 19 is coupled with the breather chamber 47.

The breather chamber 47 is configured from the bottom plate 26 which configures a bottom portion of the air cleaner 23, the wall portion 26b continuously extending in an endless form and projects from the bottom plate 26 so as to configure an outer hull of the breather chamber 47. A lid member 49 is fixed at a projecting end of the wall portion 26b. The lid member 49 is fixed to the wall portion 26b by screw members 50 which are separate members from the lid member 49 and the bottom plate 26. The screw members 50 are inserted into the lid member 49 at a plurality of locations spaced from each other in a circumferential direction of the wall portion 26b, for example, at three locations, and are screwed into the wall portion 26b.

In addition, the breather chamber 47 is disposed in the valley 20 between the front bank BF and the rear bank BR in the engine main body 17 in such a manner so as to face the valley 20 from above. Further, the breather chamber 47 is formed in a rectangular shape having a longitudinal direction coincident with the direction of an axial line of the crankshaft 18. In particular, the wall portion 26b and the lid member 49 are formed in a rectangular shape having a longitudinal direction coincident with the direction of the axial line of the crankshaft 18.

In the breather chamber 47, an upstream side flow path 47a with which the breather tube 48 is coupled and a downstream side flow path 47b continuously extending in a substantially U-shape to the upstream side flow path 47a are formed. Further, a barrier wall 26c for separating the upstream side flow path 47a and the downstream side flow path 47b from each other is integrally provided on one of the lid member 50 and the bottom plate 26, in the embodiment, on the bottom plate 26.

In the embodiment, the barrier wall 26c is formed such that the upstream side flow path 47a and the downstream side flow path 47b are in communication with each other at the right side in the vehicle widthwise direction. Further, an upper end portion of the breather hose 48 is coupled with a coupling tube portion 26d provided in a projecting manner on a lower face of the bottom plate 26 so as to communicate with a left end portion of the upstream side flow path 47a in the vehicle widthwise direction.

In addition, the upstream side flow path 47a in the breather chamber 47 is disposed in a forward direction with respect to the downstream side flow path 47b, and the bottom plate 26 configuring the bottom portion of the breather chamber 47 is inclined forwardly and downwardly. Therefore, the upstream side flow path 47a is disposed at a position lower than that of the downstream side flow path 47b.

Further, a cutout 51 communicating with the purification chamber 36 in the air cleaner 23 is provided on at least one of a portion of the wall portion 26b near to the lid member 49 and the lid member 49. In the embodiment, at a portion near to the lid member 49 of an intermediate portion in the longitudinal direction of the front and rear portions of the wall portion 26b. The cutouts 51 have a function for exhausting blow-by gas from within the breather chamber 47 to the purification chamber 36 and another function for allowing leaking of liquid components separated from the blow-by gas and collected in the breather chamber 47 from the breather chamber 47.

Further, on a side wall of each of the air funnels 43F at the front bank BF and the air funnels 43R at the rear bank BR side, a pair of slits 52 and 53 communicating with a lower portion of the air cleaner 23 are formed, for example, in a spaced relationship by 90 degrees from each other. The air funnels 43F and 43R are attached to the bottom plate 26 in a posture in which the silt 52 from between each pair of slits 52 and 53 is open in a forward direction and the other slit 53 is open toward the inner side in the vehicle widthwise direction.

Further, a guide projection 54 surrounding part of at least one of the plurality of air funnels 43F and 43R, in the embodiment, part of the air funnels 43F at the front bank BF side, is provided in a projecting manner on the bottom plate 26 such that liquid components moving along the upper face of the bottom plate 26 are guided into at least one of the paired slits 52 and 53 provided on the air funnels 43F side, in the embodiment, into the slit 52 provided on each air funnel 43F so as to open in a forward direction.

An action of the embodiment is hereinafter described. The breather hose 48 for guiding blow-by gas exhausted from the crankcase 19 is coupled with the breather chamber 47 formed in the air cleaner 23 disposed above the crankcase 19. Further, the upstream side flow path 47a with which the breather hose 48 is coupled and the downstream side flow path 47b continuously extending in a substantially U-shape with the upstream side flow path 47a are formed in the breather chamber 47. Therefore, the length of the flow path for the blow-by gas in the breather chamber 47 can be secured as long as possible. Thus, the separation of gas and liquid in the breather chamber 47 can be accelerated.

Further, the air cleaner 23 is disposed above the crankcase 19 such that the bottom portion thereof is inclined forwardly and downwardly with respect to a horizontal plane. Further, the upstream side flow path 47a in the breather chamber 47 is disposed at a position lower than that of the downstream side flow path 47b. Therefore, liquid components separated from the blow-by gas in the breather chamber 47 can be returned to the breather hose 48 side by gravity.

Further, the breather chamber 47 is formed from the bottom plate 26 configuring the bottom portion of the air cleaner 23, the wall portion 26b provided in a projecting manner from the bottom plate 26 and continuously extending in an endless form so as to configure the outer hull of the breather chamber 47. The lid member 49 is fixed to the projecting end of the wall portion 26b. Further, the cutout 51 communicating with the purification chamber 36 in the air cleaner 23 is provided on at least one of the portion of the wall portion 26b near to the lid member 49 and the lid member 49 (in the embodiment, at the portion of the wall portion 26b near to the lid member 49). Therefore, the blow-by gas can be guided into the air cleaner 23 and the liquid components collected in the breather chamber 47 can be allowed to leak from the cutout 51 into the air cleaner 23.

Further, the air funnels 43F and 43R for guiding air to the cylinder heads 37F and 37R side of the engine main body 17 are disposed so as to extend through the bottom plate 26 such that the upstream end portions of the air funnels 43F and 43R are communicated with the purification chamber 36. Further, the slits 52 and 53 communicating with the lower portion of the air cleaner 23 are formed on the side wall of the air funnels 43F and 43R. Therefore, the liquid components leaking from the breather chamber 47 into the air cleaner 23 can be guided from the slits 52 and 53 into the air funnels 43F and 43R and returned to the engine main body 17 side.

Further, the guide projection 54 surrounding part of at least one of the plurality of air funnels 43F and 43R, in the embodiment, part of the air funnels 43F at the front bank BF side, is provided in a projecting manner on the bottom plate 26 such that liquid components moving along the upper face of the bottom plate 26 are guided into at least one of the paired slits 52 and 53 provided on the air funnel 43F (in the embodiment, to the slit 52 provided on the air funnel 43F so as to open in a forward direction). Therefore, the liquid components leaking from the breather chamber 47 into the air cleaner 23 can be moved along the guide projection 54 so as to be guided to the slit 52 side of the air funnel 43F of the front bank BF. Thus, the liquid components can be effectively guided from the air cleaner 23 into the air funnel 43F at the front bank BF side.

In addition, in the embodiment, the cutout 51 is provided at each of the portions near to the lid member 49 of the intermediate portions in the longitudinal direction at the front and rear portions of the wall portions 26b. Further, the bottom portion of the air cleaner 23 is inclined forwardly and downwardly. Therefore, the liquid components leaking from the cutout 51 provided at the front portion of the wall portion 26b flow into the air funnels 43F through the slits 52 and 53 of the air funnels 43F at the front bank BF side placed in a forward direction with respect to the breather chamber 47. However, if the liquid components fill the breather chamber 47 from some reason or the bottom portion of the air cleaner 23 is inclined rearwardly and downwardly in accordance with the operation of the motorcycle, then the liquid components leaking from the cutout 51 at the rear portion of the wall portion 26b flow into each of the air funnels 43R through the slits 52 and 53 of the air funnel 43R placed rearwardly with respect to the breather chamber 47.

Further, the engine main body 17 has the paired banks BF and BR which form the valley 20 therebetween such that it is configured in a V-shape, and the breather chamber 47 is disposed so as to face the valley 20 from above. Therefore, the breather chamber 47 can be disposed compactly. Further, since the breather chamber 47 is formed in a rectangular shape having a longitudinal direction coincident with the direction of the axial line of the crankshaft 18, the breather chamber 47 can be formed greater utilizing the space of the valley 20 between the banks BF and BR.

Further, the lid member 49 and the bottom plate 26 are individually formed from a resin material and the lid member 49 is fixed to the wall portion 26b by the screw members 50 formed as separate members from the lid member 49 and the bottom plate 26. Therefore, the breather chamber 47 can be formed at a low cost.

Further, the main frame 14 extending rearwardly from the head pipe 13 at the front end of the vehicle body frame F has a hollow monocoque structure and at least part of the cleaner case 24 of the air cleaner 23 is configured from the main frame 14 and the bottom plate 26 which closes up the opening 25 provided at the lower portion of the main frame 14. Therefore, the air cleaner 23 can be configured compactly. Further, by forming the breather chamber 47 on the bottom plate 26 which closes up the opening 25 provided at the lower portion of the main frame 14, the breather chamber 47 can be formed easily in the air cleaner 23. Consequently, the entire breather apparatus can be configured compactly.

While an embodiment of the present invention has been described, the present invention is not limited to the embodiment described above, but various design changes can be made without departing from the scope of the present invention described in the claims.

For example, while, in the embodiment described above, the lid member 49 is fixed to the wall portion 26b by the screw members 50, the lid member 49 may be fixed to the wall portion 26b by riveting or by welding, or the lid member 49 may be directly welded to the wall portion 26b.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A breather apparatus for an internal combustion engine for a vehicle, comprising:
   an air cleaner disposed above a crankcase which configures part of an engine main body incorporated in a vehicle body frame and supports a crankshaft for rotation; and a breather tube coupled with a breather chamber formed in the air cleaner and configured to guide blow-by gas exhausted from the crankcase;

wherein an upstream side flow path with which the breather tube is coupled and a downstream side flow path continuously extending in a substantially U-shape to the upstream side flow path are provided in the breather chamber.

2. The breather apparatus for an internal combustion engine for a vehicle according to claim 1, wherein the air cleaner is disposed above the crankcase such that a bottom portion thereof is inclined with respect to a horizontal plane, and the upstream side flow path in the breather chamber is disposed at a position lower than that of the downstream side flow path.

3. The breather apparatus for an internal combustion engine for a vehicle according to claim 1,
wherein the breather chamber is formed from a bottom plate which configures the bottom portion of the air cleaner, a wall portion provided in a projecting manner from the bottom plate so as to continuously extend in an endless form so as to configure an outer hull of the breather chamber, and a lid member fixed to a projecting end of the wall portion; and
a cutout communicating with a purification chamber in the air cleaner is provided on at least one of a portion of the wall portion near to the lid member and the lid member.

4. The breather apparatus for an internal combustion engine for a vehicle according to claim 2,
wherein the breather chamber is formed from a bottom plate which configures the bottom portion of the air cleaner, a wall portion provided in a projecting manner from the bottom plate so as to continuously extend in an endless form so as to configure an outer hull of the breather chamber, and a lid member fixed to a projecting end of the wall portion; and
a cutout communicating with a purification chamber in the air cleaner is provided on at least one of a portion of the wall portion near to the lid member and the lid member.

5. The breather apparatus for an internal combustion engine for a vehicle according to claim 3,
wherein a passage member for guiding air to the engine main body side is disposed so as to extend through the bottom plate such that an upstream end portion of the passage member is in communication with the purification chamber; and
a slit communicating with a lower portion in the air cleaner is formed on a side wall of the passage member.

6. The breather apparatus for an internal combustion engine for a vehicle according to claim 5, wherein a guide projection which surrounds part of at least one of a plurality of passage members is provided in a projecting manner on the bottom plate such that liquid components moving along an upper face of the bottom plate are guided to at least one of a plurality of slits provided on the one passage member.

7. The breather apparatus for an internal combustion engine for a vehicle according to claim 1,
wherein the engine main body is configured in a V-shape by having a pair of banks (BF, BR) which form a valley therebetween; and
the breather chamber, disposed in the valley so as to face the valley from above, is formed in a rectangular shape having a longitudinal direction coincident with the direction of an axial line of the crankshaft.

8. The breather apparatus for an internal combustion engine for a vehicle according to claim 2,
wherein the engine main body is configured in a V-shape by having a pair of banks (BF, BR) which form a valley therebetween; and
the breather chamber, disposed in the valley so as to face the valley from above, is formed in a rectangular shape having a longitudinal direction coincident with the direction of an axial line of the crankshaft.

9. The breather apparatus for an internal combustion engine for a vehicle according to claim 3,
wherein the engine main body is configured in a V-shape by having a pair of banks (BF, BR) which form a valley therebetween; and
the breather chamber, disposed in the valley so as to face the valley from above, is formed in a rectangular shape having a longitudinal direction coincident with the direction of an axial line of the crankshaft.

10. The breather apparatus for an internal combustion engine for a vehicle according to claim 3,
wherein the lid member and the bottom plate are each configured from a resin material; and
the lid member is fixed to the wall portion by a fixing member formed as a separated member from the lid member and the bottom plate.

11. The breather apparatus for an internal combustion engine for a vehicle according to claim 5,
wherein the lid member and the bottom plate are each configured from a resin material; and
the lid member is fixed to the wall portion by a fixing member formed as a separated member from the lid member and the bottom plate.

12. The breather apparatus for an internal combustion engine for a vehicle according to claim 3,
wherein part of the vehicle body frame is configured from a head pipe at a front end of the vehicle body frame, and a main frame extending rearwardly from the head pipe and having a hollow monocoque structure; and
at least part of a cleaner case of the air cleaner is configured from the main frame and the bottom plate configured to close up an opening is provided at a lower portion of the main frame.

13. The breather apparatus for an internal combustion engine for a vehicle according to claim 5,
wherein part of the vehicle body frame is configured from a head pipe at a front end of the vehicle body frame, and a main frame extending rearwardly from the head pipe and having a hollow monocoque structure; and
at least part of a cleaner case of the air cleaner is configured from the main frame and the bottom plate configured to close up an opening is provided at a lower portion of the main frame.

14. A breather apparatus for an internal combustion engine for a vehicle, comprising:
an air cleaner with a breather chamber formed therein; and
a breather tube coupled with the breather chamber formed in the air cleaner, said breather tube being configured to guide blow-by gas exhausted from a crankcase;
wherein an upstream side flow path coupled to the breather tube and a downstream side flow path continuously extending in a substantially U-shape to the upstream side flow path are provided in the breather chamber.

15. The breather apparatus for an internal combustion engine for a vehicle according to claim 14, wherein the air cleaner is disposed above the crankcase such that a bottom portion thereof is inclined with respect to a horizontal plane, and the upstream side flow path in the breather chamber is disposed at a position lower than that of the downstream side flow path.

16. The breather apparatus for an internal combustion engine for a vehicle according to claim 14,
   wherein the breather chamber is formed from a bottom plate which configures the bottom portion of the air cleaner, a wall portion provided in a projecting manner from the bottom plate so as to continuously extend in an endless form so as to configure an outer hull of the breather chamber, and a lid member fixed to a projecting end of the wall portion; and
   a cutout communicating with a purification chamber in the air cleaner is provided on at least one of a portion of the wall portion near to the lid member and the lid member.

17. The breather apparatus for an internal combustion engine for a vehicle according to claim 16,
   wherein a passage member for guiding air to the engine main body side is disposed so as to extend through the bottom plate such that an upstream end portion of the passage member is in communication with the purification chamber; and
   a slit communicating with a lower portion in the air cleaner is formed on a side wall of the passage member.

18. The breather apparatus for an internal combustion engine for a vehicle according to claim 17, wherein a guide projection surrounding part of at least one of a plurality of passage members is provided in a projecting manner on the bottom plate such that liquid components moving along an upper face of the bottom plate are guided to at least one of a plurality of slits provided on the one passage member.

19. The breather apparatus for an internal combustion engine for a vehicle according to claim 14,
   wherein the engine main body is configured in a V-shape by having a pair of banks (BF, BR) which form a valley therebetween; and
   the breather chamber, disposed in the valley so as to face the valley from above, is formed in a rectangular shape having a longitudinal direction coincident with the direction of an axial line of the crankshaft.

20. The breather apparatus for an internal combustion engine for a vehicle according to claim 16,
   wherein the lid member and the bottom plate are each configured from a resin material; and
   the lid member is fixed to the wall portion by a fixing member formed as a separated member from the lid member and the bottom plate.

* * * * *